Patented Apr. 24, 1945

2,374,340

UNITED STATES PATENT OFFICE 2,374,340

PREPARATION OF HEXAMETHYLENE DIISOCYANATE

Mark W. Farlow, Wilmington, Del., assignor to E. I. du Pont de Nemours & Company, Wilmington, Del., a corporation of Delaware No Drawing. Application December 26, 1940, Serial No. 371,835

6 Claims. (Cl. 260—453)

This invention relates to the preparation of hexamethylene diisocyanate.

In the copending application of W. E. Hanford, filed March 15, 1938, Serial No. 196,087, there is disclosed a process for the preparation of long chain isocyanates from acyclic primary amines, wherein the amino group or groups are attached to an acyclic hydrocarbon radical of at least six carbon atoms, by reacting said amine or a hydrohalide thereof with phosgene in the presence of a solvent for the reactants. However, due possibly to the high carbon to halogen ratio in hexamethylenediamine hydrochloride, solvents for this specific compound are difficult to find and, in so far as hexamethylenediamine is concerned, the Hanford process is limited in its applicability.

This invention therefore has as an object the provision of a new and improved process for preparing hexamethylene diisocyanate from hexamethylenediamine dihydrochloride.

These objects are accomplished by the following invention wherein hexamethylenediamine dihydrochloride is reacted with phosgene at a temperature of at least 165° C., but below the decomposition point of the reactants and products and preferably below about 250° C. in the presence of an inert cyclic non-solvent for the dihydrochloride which boils above 165° C. at 760 mm. Particularly useful are hydrocarbons of from ten to eleven carbon atoms, at least four of which are aliphatic, said hydrocarbon having a ring of six carbon atoms. Cycloaliphatic carbon atoms are included within the term "aliphatic."

The more detailed practice of the invention is illustrated by the following examples, wherein parts given are by weight. There are of course many forms of the invention other than these specific embodiments.

Example I

Dry hydrogen chloride is passed through a stirred solution of 58 parts of hexamethylenediamine in 450 parts of decahydronaphthalene until formation of hexamethylenediamine dihydrochloride is complete as shown by no further absoption of hydrogen chloride. Tests indicate that the solubility of the dihydrochloride is less than 0.005 gm. per 100 gm. of decahydronaphthalene. The resulting suspension is then heated under reflux with stirring, and a rapid stream of dry phosgene is passed through the mixture for ten hours. At the end of this time, the mixture is cooled and filtered, and the filtrate distilled in vacuo. There is obtained 62 parts or a 74% yield of hexamethylene diisocyanate, B. P. 150–152° C./30 mm.

Example II

A solution of 77 parts of hexamethylenediamine in 580 parts of amylbenzene is prepared and the diamine dihydrochloride precipitated as in Example I. Tests show the dihydrochloride dissolves in the amylbenzene only to the extent of about 0.001 gm./100 g. solution. The mixture is then heated under reflux, and 218 parts of phosgene is passed through with vigorous stirring over a period of eight hours, care being observed in the adequate disposal of the off-gases which contain hydrogen chloride together with some phosgene. The final mixture is cooled and filtered, and the filtrate is distilled in vacuo, the following being obtained: 550 parts of amylbenzene, B. P. 84–85° C./23 mm.; 5 parts of an intermediate cut; 100 parts of hexamethylene diisocyanate, B. P. 143–144° C./23 mm.; and 3 parts of a tarry residue. The yield of diisocyanate is 90% of the theoretical.

Example III

Hexamethylenediammonium chloride, 37.4 lbs., is charged into a 25-gallon enamel-lined reaction kettle along with thirteen gallons of 1,2,3,4-tetrahydronaphthalene. Qualitative tests indicate that hexamethylenediammonium chloride is insoluble in 1,2,3,4-tetrahydronaphthalene. The suspension is stirred vigorously and heated under reflux. Gaseous phosgene is passed through the mixture at the rate of 7.5 lbs./hr. until the exit gas consists of essentially pure phosgene. A period of about ten to twenty hours is required, depending on the efficiency of agitation. Distillation of the crude product gives unchanged 1,2,3,4-tetrahydronaphthalene together with 28–29 lbs. of hexamethylene diisocyanate, B. P. 125–130° C./15–18 mm., or a yield of 85–88% of the theoretical.

Example IV

A suspension of 37.4 lbs. of hexamethylenediammonium chloride in thirteen gallons of p-cymene, in which the chloride is insoluble, is heated to reflux in the reaction vessel of Example III and stirred while phosgene is passed thru at the rate of 7.5 pounds per hour for a period of twenty to thirty hours, i. e., until the exit gas is essentially phosgene. Distillation of the mixture gives 28–29 lbs., or an 85–88% yield, of hexamethylene diisocyanate, boiling at 125–130° C. at 15–18 mm.

As indicated in the above examples, 1,2,3,4- tetrahydronaphthalene, decahydronaphthalene, amylbenzene and p-cymene represent a preferred group of cyclic non-solvents. However, any inert cyclic non-solvent for the dihydrochloride of B. P. above 165° C./760 mm. can be used, as can any cyclic hydrocarbon having from ten to eleven carbon atoms, of which at least four are aliphatic carbon atoms, and of which six form a ring. Other cyclic non-solvents which can be used include n-dodecylbenzene, naphthalene, n-heptylcyclopentane, and diphenyl.

The present invention is of advantage in that it allows of a complete reaction to the diisocyanate in a much shorter time. Thus the rate of reaction to the diisocyanate, in the refluxing liquid is about 15% per hour in amylbenzene, but only about 2 to 3% per hour in low boiling acyclic nonsolvents such as tetrachloroethane. Similarly, the reaction is complete in about eight hours in amylbenzene where it is not complete at the end of thirty hours when employing tetrachloroethane or xylene, a cyclic non-solvent boiling below the required minimum of about 165° C.

The above description and examples are intended to be illustrative only. Any modification of or variation therefrom which conforms to the spirit of the invention is intended to be included within the scope of the claims.

What is claimed is:

1. Process for preparing hexamethylene diisocyanate which comprises passing dry hydrogen chloride into a solution of hexamethylenediamine in a hydrocarbon of from ten to eleven carbon atoms of which at least four are aliphatic and of which six form a ring, and thereafter heating and stirring the hexamethylenediamine dihydrochloride suspension with phosgene at a temperature of at least 165° C.

2. Process of preparing hexamethylene diisocyanate which comprises heating and stirring hexamethylenediamine dihydrochloride and phosgene at a temperature of at least 165° C. in the presence of a hydrocarbon of from ten to eleven carbon atoms, of which at least four are aliphatic, and of which six form a ring.

3. Process for preparing hexamethylene diisocyanate which comprises heating and stirring hexamethylenediamine dihydrochloride and phosgene at a temperature of at least 165° C. in the presence of a cyclic hydrocarbon of the class consisting of amylbenzene, decahydronaphthalene, 1,2,3,4-tetrahydronaphthalene, and p-cymene.

4. Process for preparing hexamethylene diisocyanate which comprises heating hexamethylenediamine dihydrochloride and phosgene to a temperature of at least 165° C. in amylbenzene.

5. Process for preparing hexamethylene diisocyanate which comprises heating hexamethylenediamine dihydrochloride and phosgene to a temperature of at least 165° C. in 1,2,3,4-tetrahydronaphthalene.

6. Process for preparing hexamethylene diisocyanate which comprises heating hexamethylenediamine dihydrochloride and phosgene to a temperature of at least 165° C. in decahydronaphthalene.

MARK W. FARLOW.